United States Patent
Leduby et al.

(10) Patent No.: US 11,057,669 B2
(45) Date of Patent: Jul. 6, 2021

(54) DEVICE AND METHOD FOR MANAGING PRIORITIES FOR THE DOWNLOADING OF MULTIMEDIA CONTENTS

(71) Applicant: Orange, Issy-les-Moulineaux (FR)

(72) Inventors: Jean-Bernard Leduby, Erquy (FR); Martin Conan, Cesson Sevigne (FR)

(73) Assignee: ORANGE, Issy-les-Moulineaux (FR)

( * ) Notice: Subject to any disclaimer, the term of this patent is extended or adjusted under 35 U.S.C. 154(b) by 0 days.

(21) Appl. No.: 15/537,658

(22) PCT Filed: Dec. 7, 2015

(86) PCT No.: PCT/FR2015/053360
§ 371 (c)(1),
(2) Date: Jun. 19, 2017

(87) PCT Pub. No.: WO2016/097530
PCT Pub. Date: Jun. 23, 2016

(65) Prior Publication Data
US 2017/0359617 A1 Dec. 14, 2017

(30) Foreign Application Priority Data
Dec. 19, 2014 (FR) ...................... 1462884

(51) Int. Cl.
*H04N 21/222* (2011.01)
*H04N 21/231* (2011.01)
(Continued)

(52) U.S. Cl.
CPC ....... *H04N 21/43615* (2013.01); *H04L 67/06* (2013.01); *H04N 21/4126* (2013.01);
(Continued)

(58) Field of Classification Search
None
See application file for complete search history.

(56) References Cited

U.S. PATENT DOCUMENTS

2003/0156218 A1* 8/2003 Laksono ............ H04N 21/4383
348/388.1
2010/0058400 A1* 3/2010 Nicas ................. H04N 21/2143
725/74
(Continued)

FOREIGN PATENT DOCUMENTS

| EP | 2525530 A1 | 11/2012 |
|---|---|---|
| WO | 2007067974 A2 | 6/2007 |
| WO | 2012009095 A2 | 1/2012 |

OTHER PUBLICATIONS

International Search Report dated Feb. 18, 2016 for corresponding International Application No. PCT/FR2015/053360, filed Dec. 7, 2015.
(Continued)

*Primary Examiner* — Brian T Pendleton
*Assistant Examiner* — Jean D Saint Cyr
(74) *Attorney, Agent, or Firm* — David D. Brush; Westman, Champlin & Koehler, P.A.

(57) ABSTRACT

A method and device for managing downloading of a digital content available by progressive downloading onto a content server in a communication network. The content server is accessible via a service gateway of a local network including first and second terminals. The method includes: receiving a request for progressive downloading of first digital content from the first terminal; receiving a request for progressive downloading of second digital content from the second terminal; obtaining rights relating to the terminals on the downloading device including data regarding priority of the
(Continued)

first and second terminals, data relating to a priority of use of the downloading device; comparing the data regarding priority of the first terminal with the data regarding priority of the second terminal, so as to define the terminal having priority; downloading the digital content requested by the terminal having priority.

10 Claims, 2 Drawing Sheets

(51) Int. Cl.
| | |
|---|---|
| *H04N 21/239* | (2011.01) |
| *H04N 21/262* | (2011.01) |
| *H04N 21/4627* | (2011.01) |
| *H04N 21/436* | (2011.01) |
| *H04N 21/41* | (2011.01) |
| *H04N 21/458* | (2011.01) |
| *H04N 21/475* | (2011.01) |
| *H04N 21/61* | (2011.01) |
| *H04L 29/08* | (2006.01) |

(52) U.S. Cl.
CPC ..... *H04N 21/4583* (2013.01); *H04N 21/4751* (2013.01); *H04N 21/6125* (2013.01)

(56) References Cited

U.S. PATENT DOCUMENTS

| | | | |
|---|---|---|---|
| 2010/0158039 A1* | 6/2010 | Koide | H04B 3/542 370/447 |
| 2011/0013091 A1 | 1/2011 | Kim | |
| 2012/0011160 A1* | 1/2012 | Rauhala | H04L 67/06 707/784 |
| 2014/0152899 A1* | 6/2014 | Newell | H04N 21/4415 348/734 |
| 2014/0280764 A1* | 9/2014 | Dasher | H04L 65/60 709/219 |
| 2014/0282786 A1* | 9/2014 | Lajoie | H04N 21/44 725/115 |
| 2016/0066025 A1* | 3/2016 | Wang | H04N 21/4331 725/14 |
| 2016/0127504 A1* | 5/2016 | Takahashi | H04L 67/34 709/219 |

OTHER PUBLICATIONS

Written Opinion of the International Searching Authority dated Feb. 18, 2016 for corresponding International Application No. PCT/FR2015/053360, filed Dec. 7, 2015.

English translation of the International Written Opinion dated Jun. 8, 2017, for corresponding International Application No. PCT/FR2015/053360, filed Dec. 7, 2015.

* cited by examiner

DEVICE AND METHOD FOR MANAGING PRIORITIES FOR THE DOWNLOADING OF MULTIMEDIA CONTENTS

CROSS-REFERENCE TO RELATED APPLICATIONS

This Application is a Section 371 National Stage Application of International Application No. PCT/FR2015/053360, filed Dec. 7, 2015, the content of which is incorporated herein by reference in its entirety, and published as WO 2016/097530 on Jun. 23, 2016, not in English.

TECHNICAL FIELD

The invention applies to the playback of a digital multimedia content on a device endowed with a playback function, referred to as playback device, or more simply television, by means of a specific device, referred to as downloading device, designed to access the contents on the Internet network and transmit them to the television.

The invention applies most particularly to the playback of such contents via such a device for progressive downloading by several users of the same local area network.

PRIOR ART

It is commonplace for digital multimedia contents (video, audio, etc.) originating from the Internet network to be played back on an arbitrary device of a user, for example a television or a digital tablet. Digital content is understood to mean films, videos, or more generally any type of digital multimedia content which can be transmitted in the Internet network considered. One also speaks of contents received by "streaming" or "streamed" contents to indicate thereby that they are received by continuous downloading from the broadband Internet network, in English WAN, the acronym standing for Wide Area Network as opposed to the LAN (Local Area Network) of local range, and can be played back in real time on a terminal of the user.

To receive the digital content, the terminal generally issues a request destined for a server which is situated in the WAN, indicating an address of the desired content, and it receives in return a stream of digital data relating to this content.

Playback consists in providing, at the level of the playback device, the digital content in a form accessible to the user. For example, data received corresponding to a digital video are generally decoded, and then played back at the level of a television, in the form of a display, or viewing, of the corresponding video with its associated sound track.

A television may be designed so that it can itself access the contents streamed over the WAN. One speaks, in this case, of "connected" television, that is to say that the TV can be hooked up to the Internet network so as to provide the users with a set of services. If playback is not performed under the control of a service operator, one also speaks in this case of contents of OTT type, the English acronym standing for "Over The Top". OTT television allows a user of a TV connected to the Internet network to play back digital channels or Web contents on the television. Generally, this type of "connected" television can be interfaced with the user's local area network and thereby access a contents server in the wide area network. In this case, it is the TV itself which manages the content downloads.

If the TV is not connected, it is commonplace to connect another terminal thereto, for example a personal computer (PC) or a specific device (in the form for example of an electronic key) to access the streamed Internet contents and transmit them to the television, in particular via its HDMI interface (High Definition Multimedia Interface), a digital communication interface able to transmit uncompressed audio and video signals with high definition, standardized by the HDMI forum. Hereinafter, this downloading device is called a "TV Downloading Device", TVDD for short, or TVDD key.

It is known to use a control terminal, for example a mobile telephone (smartphone) or a digital tablet to select digital contents intended to be played on the television. If the contents are downloaded via a TVDD key connected to the television, the control terminal, then playing the role of a remote control, takes control of the TVDD key so as to give it the appropriate orders relating to the downloading (download a content, change it, pause, go forward or back in the content, etc.).

However, in such a context, if several potential users of the television desire to view a digital content at the same time, this poses a problem: indeed, today, it is the last user who manifests said desire who takes control of the TVDD key via his control terminal (tablet, etc.), possibly interrupting a content viewing that might have already been initiated by another user.

SUMMARY

For this purpose, according to a functional aspect, the subject of the invention is a method for managing the downloading of a digital content available by progressive downloading from a contents server in a communication network, said contents server being accessible via a service gateway of a local area network including a first terminal and a second terminal, the method being characterized in that it comprises the following steps:

reception of a request for progressive downloading of a first digital content originating from the first terminal;

reception of a request for progressive downloading of a second digital content originating from the second terminal;

obtaining of rights relating to the terminals on the downloading device, comprising at least one priority datum of the first terminal and of the second terminal, said data relating to a priority of use of the downloading device;

comparison of the priority datum of the first terminal with the priority datum of the second terminal, so as to define the terminal having priority;

downloading of the digital content requested by the terminal having priority.

Thus, the invention offers the advantage, if a first user is in the process of downloading a content via a downloading device and of viewing it on a playback device of television type, of authorizing access to a content for a second user only if the latter has a higher priority than that of the terminal of the user currently downloading. Advantageously, it is possible via this mechanism to instigate a hierarchy of priorities on the TVDD key and therefore to prevent the last user having arrived in the local area network from forcefully taking control of the key, unless he possesses the highest priority.

According to a particular mode of implementation of the invention, the method for managing downloading is furthermore characterized in that the rights relating to the terminals are contained in a file of user rights and in that the method comprises a step of reading said rights in said file.

Advantageously, a File of User Rights, grouping together the rights of the users of the device, can be created and modified at any time. It may be located for example in the WAN on a file server, or on the service gateway or on one of the terminals of the local area network (hard disk, PC, etc.). A user, privileged or otherwise, registers for example the rights in this file from his smartphone or any other item of equipment linked to the gateway of the local area network.

According to a second particular mode of implementation of the invention, which will be able to be implemented alternatively or cumulatively with the previous mode of implementation, the method for managing downloading is furthermore characterized in that the step of obtaining rights is preceded by the steps of:

defining a unique association between a terminal, referred to as the master terminal, and the downloading device;

assigning the highest priority to said master terminal.

Advantageously according to this embodiment, the master, who is for example the owner of the TV key, has priority over all the other users. The downloading of a content requested by a terminal of the local area network other than that of the master thus cannot interrupt the master.

According to a variant of this particular mode of implementation of the invention, the method for managing downloading is furthermore characterized in that the reading step is carried out only if the terminal originating the request is a terminal other than the master terminal.

Advantageously, the master terminal possesses all the rights regarding the downloading device and no verification is performed when it requests a content, thereby allowing it in particular not to be connected itself to the WAN network, or not to undergo its disruptions (if, for example, the file of user rights took a while to be provided to it via the gateway).

According to a second variant of this particular mode of implementation of the invention, which will be able to be implemented alternatively or cumulatively with the previous mode of implementation, the method is furthermore characterized in that the downloading is preceded by a notification to the master terminal.

In this manner, the master will be able to agree, or refuse, to authorize the downloading of the content, and this may be advantageous in particular in the case of a guest who might have only very restricted rights, or whom the master might exceptionally authorize to take control of the TVDD key, even if he does not have priority.

In particular, the master can agree, via this mechanism, to be supplanted in the use of the TVDD key.

According to another functional aspect, the invention also relates to a method for managing the rights of a user terminal on a downloading device for downloading a digital content available by progressive downloading from a contents server in a communication network, said server being accessible via a service gateway of a local area network including a first terminal and a second terminal, the method being characterized in that it comprises a step of creating a file of user rights containing:

an association between the downloading device and a user terminal referred to as the master terminal;

the rights of the user terminals on the downloading device, the rights of a user terminal including at least one priority datum of the terminal, so as to define between two terminals the terminal having priority in the use of the downloading device, the highest priority being associated with the master device.

Thus, the method for managing the user's rights records, on demand by the master, a file of rights of the users which contains inter alia the priorities of access of the various terminals of the local area network to the contents. In this manner, it is easy to specify, for each terminal, whether it will or will not be able to access the content and interrupt another terminal of lower priority.

According to a hardware aspect, the invention also relates to a device for managing downloading for the progressive downloading of a digital content available on a contents server in a communication network, said contents server being accessible via a service gateway of a local area network including a first terminal and a second terminal, the device being characterized in that it comprises:

a module for receiving a request for progressive downloading of a first digital content originating from the first terminal and of a second digital content originating from the second terminal;

a module for obtaining rights relating to the terminals on the downloading device, comprising at least one priority datum of the first terminal and of the second terminal, said data relating to a priority of use of the downloading device;

a module for comparing the priority datum of the first terminal with the priority datum of the second terminal so as to define the terminal having priority in the use of the downloading device;

a module for downloading the digital content requested by the terminal having priority.

The term module can correspond either to a software component or to a hardware component or a set of hardware components and software components, a software component itself corresponding to one or more computer programs or subprograms or more generally to any element of a program able to implement a function or a set of functions such as described for the modules concerned. In the same manner, a hardware component corresponds to any element of a hardware set able to implement a function or a set of functions for the module concerned (integrated circuit, chip card, memory card, etc.).

According to another hardware aspect, the invention further relates to an electronic key including a device for managing downloading such as described hereinabove.

According to another hardware aspect, the invention further relates to a device for managing the rights of a user terminal on a downloading device for downloading a digital content available by progressive downloading from a contents server in a communication network, said server being accessible via a service gateway of a local area network including a first terminal and a second terminal, the device being characterized in that it comprises a module for creating a file of user rights containing:

an association between the downloading device and a user terminal referred to as the master terminal;

the rights of the user terminals on the downloading device, the rights of a user terminal including at least one priority datum, so as to define between two terminals the terminal having priority in the use of the device, the highest priority being associated with the master terminal.

According to another hardware aspect, the invention further relates to a terminal including a device for managing rights such as is defined hereinabove.

According to another hardware aspect, the invention further relates to a service gateway including a device for managing rights such as is defined hereinabove.

According to another hardware aspect, the invention also relates to a computer program able to be implemented in respect of the method for managing downloading such as is defined hereinabove, the program comprising code instructions which, when the program is executed by a processor, carries out the steps of the method for managing downloading.

According to another hardware aspect, the invention also relates to a computer program able to be implemented in respect of the management method such as is defined hereinabove, the program comprising code instructions which, when the program is executed by a processor, carries out the steps of the method for managing priorities.

According to yet another hardware aspect, the invention deals with a recording medium readable by a data processor on which is recorded a program comprising program code instructions for the execution of the steps of any one of the methods defined hereinabove.

These devices, this computer program, this recording medium, exhibit characteristics and advantages analogous to those described previously in conjunction with the downloading and management methods.

The invention will be better understood on reading the description which follows, given by way of example and with reference to the appended drawings.

DETAILED DESCRIPTION OF AN EXEMPLARY EMBODIMENT ILLUSTRATING THE INVENTION

Figure 1:
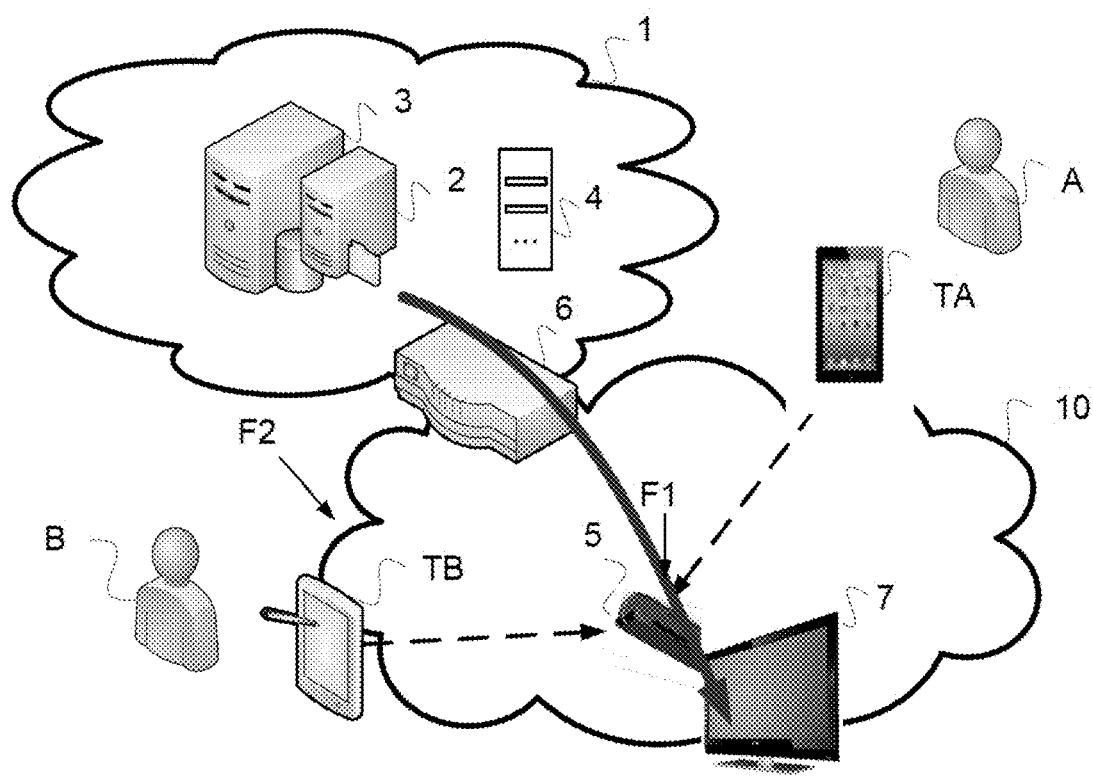
FIG. 1 represents the general context of a local area network in which a playback device is associated with a TVDD key in a local area network.

FIG. 1 represents the general context of a local area network (10) in which a playback device is associated with a TVDD key (5).

The local area network (10) of a user (A), referred to as the "main user", or "master" is connected to the wide area network (WAN, 1) via a service gateway (6).

It is recalled here that a local area network, also called a domestic network, is a computerized network which links together, by wire or wirelessly, the terminals of a house (computers, peripherals for printing, playback, storage, etc.) able to communicate together. A domestic network generally comprises a router item of equipment, also commonly called a domestic gateway, or service gateway (6), an intermediate element ensuring the redirection, or routing, of data packets between the various terminals and the networks which are connected to it. Such a domestic network often connects the various terminals by using WiFi wireless or Ethernet wired technology, both types of medium being designed for communications based on the protocols of the IP (Internet Protocol) family, basic protocol for networks of Internet type and by extension, name of the network itself). For this purpose, the service gateway comprises a WiFi communication function, or WiFi access point, which allows it to communicate wirelessly with the terminals of the network. Hereinafter, terminal device, or more simply "terminal", is understood to mean any device able to connect to the gateway (6), such as a computer or a device such as a television (TV), personal computer (PC), Smartphone (intelligent mobile telephone), PDA ("Personal Digital Assistant"), downloading device (TVDD), or more generally any device able to communicate by wire or wirelessly with the service gateway.

The context of the domestic local area network (10) is given by way of example and could be readily transposed to that of a company network.

The local area network (10) according to this embodiment of the invention comprises two terminals TA and TB associated respectively with the users A and B, and a playback device (7), or more simply television (TV).

Hereinafter, the master user himself (A) or his terminal (TA) will simply be called "the master" and likewise the guest user (B) or his terminal (TB) will simply be called "the guest". The television is associated with a TVDD key (5) connected to the local area network (10) via the service gateway (6) tasked with downloading the contents from the WAN network (1). The terminals of the local area network are able to establish connections with the WAN via the service gateway (6) which is linked to it by a high-speed link. The network (10) is for example an IP local area network and the high-speed link is of ADSL (Asymmetric Digital Subscriber Line) type. The WAN network (1) is also in this example of IP type and contains servers (3) of multimedia contents which host, in particular, digital contents for placing at the disposal of the terminals of the local area network (10) in streaming mode. According to this example, the contents server (3) is located in the WAN (1), but it could, according to another example, be situated in a local area network, for example at the level of the service gateway (6) or of any other item of equipment capable of hosting such a contents server.

In FIG. 1, the solid arrow (F1) represents the path of a content from the contents server (3) to the television (7), passing via the service gateway (6) and then the TVDD key (5).

The terminal TA is for example a smartphone. The terminal TB is for example an electronic tablet. The terminals TA and TB are both able to transmit to the TVDD key a download order, comprising a download address destined for the contents server (3). The TVDD key (5) accesses the content on the server and the service actually starts up, that is to say that the key can receive the content and have it displayed on the television, typically by using a technique of so-called "adaptive streaming" type (HAS for "HTTP Adaptive Streaming") well known to the person skilled in the art.

The master user (A) is for example the one who has taken out the subscription relating to the service gateway (6) with the proprietary network operator of the servers (3); according to this example, he is also the owner (master) of the TVDD key (5).

The user B is, according to this example, a guest of the local area network, for example a visitor of the master A. He possesses fewer rights than A. In particular, he does not have priority as regards access to the TV key.

It is assumed in this example that A has begun to view a content with the aid of the TVDD key, which he drives via his smartphone TA, for example he is watching a channel called CHA. According to the current state of the art, if the user B decides to view a content, for example on the channel CHB, nothing prevents him, as long as he has installed the appropriate application for driving the TVDD key on his terminal (TB), from accessing the TVDD key and transmitting to it the address of a content of a channel B to be downloaded. The user 1 then loses control of the key and his viewing in progress.

This is why, according to the invention, a "File of User Rights", FUR for short, (4) has previously been installed on a file server (2) in the WAN. The master user (A) registers the rights in this file for example from his smartphone (TA), or any other item of equipment linked to the gateway of the local area network. The file server (2) may be one and the same as the contents server (3) or be distinct therefrom. The file can alternatively be stored anywhere in the wide area network, or on the service gateway (6) or on one of the terminals of the local area network (hard disk, PC, etc.).

A software module for managing priorities (PRP) according to the invention has been installed on the TVDD key. This management module is able to recover the rights registered in the file of user rights (4) associated with the TVDD key, and then, as a function of the registered rights, to accept or refuse access by the terminal (TB) to the TVDD key according to a method which will be described later in support of FIG. 3.

In this example, the guest has more restricted rights than the master: in particular, he can only control the TV key if the user A has given him the right to do so and is not in the process of using it at that time. His request for content CHB according to the example will therefore be refused as long as A is in the process of downloading and playing back the content CHA.

Figure 2:
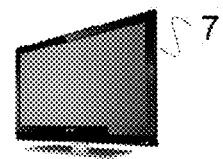
FIG. 2 represents a hardware architecture of an electronic key (TVDD) according to one embodiment of the invention.

FIG. 2 represents a hardware architecture of a device hosting a downloading module according to one embodiment the invention, for example the TVDD key (5) of FIG. 2.

The device comprises memories M geared around a processor CPU. It communicates with the local area network (10) via the communication module (WiFi) which allows it to connect preferably wirelessly (for example, but in a nonlimiting manner, via a radio channel of WiFi type) to the terminals of the network, in particular the mobile devices (TA, TB). It is supplied via a serial interface of USB type (POW). It also comprises:

an interface module (HDMI) capable of interfacing physically and logically with the television (7) for transmission of the decoded multimedia content (audio and video) and exchange of basic commands originating from the mobile (silence mode, increase volume, decrease volume, etc.)

a module for managing priorities (PRP) according to the invention, tasked with managing the rights of the TVDD key according to the embodiment described previously in support of FIG. 1. This module is in particular capable, in conjunction with this embodiment of the invention, of downloading the file of user rights (4, FUR) from the WAN via the service gateway, verifying the rights associated with the users and therefore managing conflicts between accesses which reach it, namely the requests for contents, which may be simultaneous, originating from TA and TB, a "media player" (MP) capable of playing back (receiving, decoding, preparing) the streams in streaming mode and of delivering them to the playback device (TV); the "media player" comprises inter alia a set of decoders (audio, video, etc.) able to decode the multimedia contents, as well as an interface for communication with the mobile device, able to interpret the orders originating from the latter, a communication module of HTTP type to ensure the client-server communications of HTTP type, in particular with the aim of exchanging data with the mobile terminals (TA, TB) of the local area network (exchange of identities, reception of streaming commands, acknowledgments, etc.)

with the contents and rights server in the WAN, with the aim in particular of exchanging the files (4) relating to the digital contents and to the rights of the terminals of the users on the downloading key.

Figure 3:
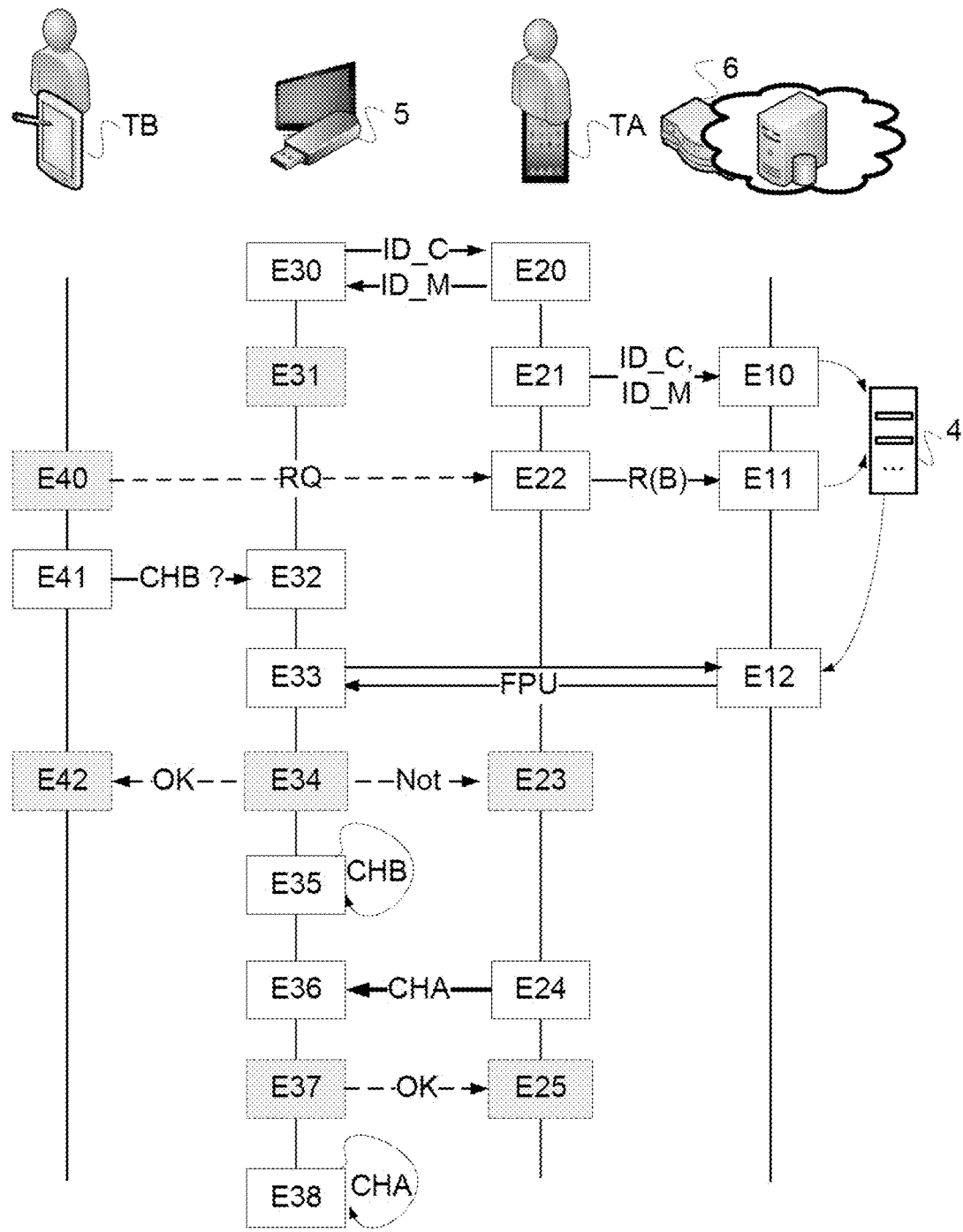
FIG. 3 represents a timechart of the exchanges between two terminals and an electronic key (TVDD) associated with a television according to one embodiment of the invention.

FIG. 3 represents a timechart of the exchanges between a playback device (TV, 7) connected to a TVDD key (5), drivable remotely by the smartphone (TB) or the tablet (TA) of the respective users B and A.

It is recalled that, in the context of this embodiment, A is the master of the TVDD key, and B is a guest to whom A can give certain rights regarding the TVDD key, these rights being registered in the file (4) of user rights.

During the initialization steps E20 and E30, a main user (according to the example, the master A) is associated in a unique manner with the TVDD key (5).

The TV key possesses a unique identifier, denoted ID_C, corresponding for example to its O.U.I (for Organizationally Unique Identifier), a unique identifier made up in particular of its physical address (MAC for Media Access Control address) and of its serial number.

The user likewise possesses a unique identifier denoted ID_M, for example his identifier with the service operator from which he bought the TVDD key (client number, etc.) and which identifies him in a one-to-one manner.

By exchanging these identifiers, a TVDD key is attached to a master user, here A, in a unique manner. In this embodiment of the invention, this step occurs just once, when buying the key for example. Alternatively, it may recur in case of a problem, or of reinitialization, etc. The two appliances being associated, the key takes control of the television and brings about for example, if no other appliance is active on another HDMI input, the display of information relating to the contents available by streaming.

During step E21, the terminal TA of the user A connects to the WAN (1) via the service gateway (6) while providing him with the identifiers of the association (ID_C, ID_M). This association is transmitted by the service gateway to the file server (2) of the WAN. A program for managing the files of rights of the users (FUR) on the server creates a file of rights (4) for this association.

During an optional step E31, an image of the association is stored in a memory of the TVDD key for operation in unconnected mode. This may entail storage in ROM, or EPROM memory, etc. It should be noted that if this step is not performed, the TVDD key will necessarily have to connect subsequently to the rights server (2) in the WAN to recover the file of rights (4), before downloading a content, and this may be lengthier and more complex.

During a step E22 of predefining accesses, the user A, who has for example just purchased the TV key and has just been associated therewith in the guise of master in the previous steps, connects to the service gateway via an IP connection (WiFi, Bluetooth, etc.) so as to define the rights associated with the TVDD key.

This connection can be done in a spontaneous manner, or because a guest user B has made during a step E40 (optional) a request for authorization of access to the TVDD key. This request may be made for example through a mobile application executing on B's terminal TB, by stringing together the chain, given by way of wholly nonlimiting indication, of following steps:

40.1 Launching of the mobile application on B's terminal TB;

40.2 Step of discovering the TVDD key in the local area network;

40.3 Selection of the TVDD key by the terminal B;

40.4 Reception of a message of the type "you are not authorized", "do you wish to request access?"

40.5 Confirmation of the access request and sending of a notification to the master (A) (RQ) for example via SMS sending or any other method of notification between mobile applications on his mobile terminal (TA).

The request is received by the master A in the course of step E22; the master can then refuse or accept the authorization request in respect of the individual identified in the request (B). Accordingly, he fills in the file of user rights for B and optionally returns an agree or disagree message to him. The rights registered in the file are denoted R(B) in FIG. 3.

Generally, A predefines, in the course of this step or independently, the set of the members authorized to access the TV key, for example in the form of a list of guest members, and configures the rights, priorities and profiles for each of the guests. An exemplary content of such a table (TUR—table of user rights) which is in the file FUR is illustrated hereinbelow; it comprises:

the identifier of the TVDD key and of the master (first row of the example) which makes it possible in particular to access the file, and then a row per potential user declared by the master, comprising:

1. a "rights" column
2. a "priorities" column to indicate the priority level. This column is optional since it is easy to deduce the priorities from the type of rights.
3. a "profiles" column to indicate the user's profile: authorized, unauthorized, authorized on demand, authorized for certain types of contents, authorized under parental control, etc.

Thus, according to this example:

A is the master of the key, he possesses by default the rights:
  of administration of the TVDD key;
  of management (read and write) of the file FUR of user rights;
  of unlimited and priority access to the contents.

C is "super-user", this is for example a member of the family; he possesses the same rights as A, but does not have priority in relation to A (for access to the contents, in particular) and cannot modify/delete the rights of the master;

B possesses rights of "guest" user with non-priority access to the contents, in standard resolution (SD) only so as not to consume too much bandwidth in the local area network;

D is limited by parental control to the contents reserved for 12 year olds and above;

E is limited to certain time slots;

F does not have the right to make use of the TVDD key.

TABLE 1 example of Table of User Rights (TUR, 4)
ID_C = "Orange key 666777" ⇔ ID_M = "01607080910"

| User | Type of right | Priority | Possible accesses |
|---|---|---|---|
| A (0607080910) | Master | 5 | Administrator; all rights |
| B (0611121314) | Guest | 1 | Rights of access to contents, non-priority, SD |
| C (4432313029) | Super-user | 4 | Administrator; all rights except relating to the master |
| D (33754XXXXXX) | Guest | 2 | Rights of access to authorized contents 12 year olds and above |
| E (0666XXXXXX) | Guest | 2 | Rights of access to contents from 17 h to 21 h |
| F (08XXXXXXXX) | Access Refused | 0 | --- (no right) |

When attempting to access a content, the corresponding profile of the user is consulted: for example, the terminal D being authorized for certain contents, his profile is examined at each request to determine whether or not he is authorized to view this type of content (if it is not prohibited to under 12 year olds).

The master's profile is not examined during an access.

Potential conflicts between users are resolved with the aid of these same priorities and profiles which make it possible to readily create a hierarchy of rights: thus, according to an exemplary implementation, nobody can interrupt the master, and then there come the super-users, and then the guests with a priority level which may optionally be specified in the file (for example: the master has a priority 5, the super-users a priority 4, the guests a priority 1 or 2, and only a user of higher priority can take control of the TVDD key if it is currently being used by a terminal of lower priority).

According to a variant, not represented, the master leaves it up to the guest to manage his profile, that is to say to write to the table of user rights (TUR).

During a step E41, B, a guest according to the example, submits an access to view a content by virtue of the TVDD key (5). He chooses, according to this example, to receive a program by streaming, for example a channel "CHB". This request is received in step E32 by the TVDD key which analyzes it.

According to an optional step E33, the TVDD key loads from the server the file of rights containing the table of user rights (TUR). Any variant within the scope of the person skilled in the art may be used so that the TVDD key always benefits from an up-to-date table:

according to a first variant, the table TUR is "pushed" to the HTTP client on the key as soon as it is modified on the server and as soon as the key is connected.

according to a second variant, it is the TVDD key which interrogates the server periodically (in English, this mode is called polling), to take into account possible modifications of the file containing the table TUR.

During a step E34, the TVDD key consults the table of user rights that it has in memory (either because it has downloaded it from the server, or because its stored version is up to date) and according to the rights that are read and the current state of the key, accedes to or denies the guest's request, that is to say it optionally transmits an acknowledgment to him during a following step E34, and then begins the downloading and the viewing of the content requested in the course of a step E35 (playback of the channel CHB).

According to a variant of step E34, the new request (that of B) is notified (Not) to the master (for example, in SMS form or by way of the application on the smartphone) which accepts or refuses the request.

During a step E24, the terminal TA of the master A requests a content (for example a channel CHA). The TVDD key then repeats the previous steps of consulting the table TUR in memory (E33, E12), analyzes the request (E34), and, according to the rights read from the table, validates or invalidates the transaction in the course of a step E37. The TVDD key passes to the control of A, to the detriment of B who has fewer rights, and plays the channel CHA (E38).

It will be noted that, in the context of a commercial offer associated with the service gateway, an operator can predefine the accesses; according to an example, all the mobiles associated with a particular offer ("open") can access the service with a higher level (in the guise of super-user) than that of a guest, and simple rules can be associated with the members of the local area network: no predefined parental control for the members, no predefined profiles for personalizing the recommendation, favorites, etc.

It goes without saying that the embodiments which have been described hereinabove have been given purely by way of wholly non-limiting indication, and that numerous modifications can easily be made by the person skilled in the art without however departing from the scope of the invention.

In particular, these embodiments can be easily transposed to the case where the mobile device (TA) is positioned as point of access to the network in tethering mode. In this case, the mobile device replaces the service gateway (6) but the exchanges are not modified.

An exemplary aspect of the present disclosure offers a solution not exhibiting the drawbacks of the state of the art.

Although the present disclosure has been described with reference to one or more examples, workers skilled in the art will recognize that changes may be made in form and detail without departing from the scope of the disclosure and/or the appended claims.

The invention claimed is:

1. A method comprising:
managing downloading digital content available by progressive downloading from a contents server in a communication network, said contents server being accessible by a downloading device distinct from the server via a service gateway of a local area network including a first terminal and a second terminal, the downloading device being selectable by each of the first terminal and the second terminal, said downloading device being able to download only one content at a time and playback the content on a single device, wherein the managing comprises the following acts performed by the downloading device:
reception of a first request for progressive downloading of a first digital content originating from the first terminal selecting the downloading device, said request containing the address of said first digital content;
downloading the first digital content requested by the first terminal;
reception of a second request for progressive downloading of a second digital content originating from the second terminal selecting the downloading device while the first digital content downloading is in progress, said request containing the address of said second digital content;
obtaining rights relating to the first and second terminals on the downloading device, comprising at least one priority datum of the first terminal and of the second terminal, said data relating to a priority of use of the downloading device;
comparison of the priority datum of the first terminal with the priority datum of the second terminal, so as to define the terminal having priority;
if the priority datum of the second terminal is greater than the priority datum of the first terminal, downloading the second digital content requested by the second terminal;
wherein a unique association is defined between either the first terminal or the second terminal, referred to as a master terminal, and the downloading device;
wherein the reception of the second request for progressive downloading on the downloading device is followed by, if the first terminal is the master terminal, sending a message to the first terminal in order for the master terminal to accept or refuse the second request.

2. The method for managing downloading as claimed in claim 1, wherein the rights relating to the first and second terminals are contained in a file of user rights and the method comprises reading said rights in said file.

3. The method for managing downloading as claimed in claim 1, wherein the act of obtaining rights is preceded by the act of assigning a highest priority to said master terminal.

4. The method as claimed in claim 3, wherein the obtaining act is carried out only if the second terminal originating the second request is a terminal other than the master terminal.

5. The method as claimed in claim 3, wherein the downloading is preceded by a notification to the master terminal.

6. A method comprising:
managing rights of a first terminal or a second terminal on a downloading device for downloading a digital content available by progressive downloading from a contents server in a communication network, said server being accessible by the downloading device distinct from the server via a service gateway of a local area network including the first terminal and the second terminal, said downloading device being able to download only one content at a time and playback the content on a single device, and said downloading device being selectable by the first terminal and the second terminal, wherein the managing comprises the following acts performed by a managing device:
creating a file of user rights containing:
an association between the downloading device and one of the first terminal and the second terminal referred to as a master terminal;
the rights of the user terminals, including the first and second terminals, on the downloading device,
wherein the rights of the user terminals include at least one priority datum of at least one terminal, so as to define between two terminals the terminal having priority in use of the device,
a highest priority being associated with the master terminal, and
providing the at least one priority datum to the downloading device upon a read initiated by the downloading device in response to a reception of a request for progressive downloading of digital content originating from at least one of the first and second terminals while downloading to at least one of the first and second terminals is in progress, the request containing the address of said digital content;
wherein the reception of the request for progressive downloading on the downloading device is followed by, if the first terminal is the master terminal, sending a message to the first terminal in order for the master terminal to accept or refuse the request from the second terminal.

7. A downloading device comprising:
a non-transitory computer-readable medium comprising instructions stored thereon; and
a processor configured by the instructions to perform acts comprising:
managing downloading for progressive downloading of a digital content available on a contents server in a communication network, said contents server being accessible by the downloading device distinct from the server via a service gateway of a local area network including a first terminal and a second terminal, the downloading device being selectable by each of the first terminal and the second terminal, said downloading device being able to download only one content at a time and playback the content on a single device, wherein the managing comprises:

receiving a first request for progressive downloading of a first digital content originating from the first terminal selecting the downloading device;

downloading the first digital content requested by the first terminal, said request containing the address of said first digital content;

receiving a second request for progressive downloading of a second digital content originating from the second terminal selecting the downloading device while the first digital content downloading is in progress, said request containing the address of said second digital content;

obtaining rights relating to the first and second terminals on the downloading device, comprising at least one priority datum of the first terminal and of the second terminal, said data relating to a priority of use of the downloading device;

comparing the priority datum of the first terminal with the priority datum of the second terminal so as to define the terminal having priority in the use of the downloading device;

if the priority datum of the second terminal is greater than the priority datum of the first terminal, downloading the second digital content requested by the second terminal;

wherein a unique association is defined between either the first terminal or the second terminal, referred to as the master terminal, and the downloading device;

wherein the reception of the second request for progressive downloading on the downloading device is followed by, if the first terminal is the master terminal, sending a message to the first terminal in order for the master terminal to accept or refuse the second request.

8. An electronic key including a device for managing downloading as claimed in claim 7.

9. A device comprising:

a non-transitory computer-readable medium comprising instructions stored thereon; and a processor configured by the instructions to perform acts comprising:

managing rights of a first terminal or a second terminal on a downloading device for downloading a digital content available by progressive downloading from a contents server in a communication network, said server being accessible by the downloading device distinct from the server via a service gateway of a local area network including the first terminal and the second terminal, and said downloading device being able to download only one content at a time and playback the content on a single device, and said downloading device being selectable by the first terminal and the second terminal, wherein the managing comprises:

creating a file of user rights containing:

an association between the downloading device and one of the first terminal and the second terminal referred to as a master terminal;

the rights of the user terminals, including the first and second terminals, on the downloading device;

wherein the rights of the user terminals include at least one priority datum, so as to define between two terminals the terminal having priority in use of the device, a highest priority being associated with the master terminal, and providing the at least one priority datum to the downloading device upon a read initiated by the downloading device in response to a reception of a request for progressive downloading of digital content originating from at least one of the first and second terminals while downloading to at least one of the first and second terminal is in progress, the request containing the address of said digital content;

wherein the reception of the request for progressive downloading on the downloading device is followed by, if the first terminal is the master terminal, sending a message to the first terminal in order for the master terminal to accept or refuse the request from the second terminal.

10. A service gateway including the device for managing rights defined in claim 9.

* * * * *